(12) United States Patent
Lazaridis

(10) Patent No.: US 9,510,135 B2
(45) Date of Patent: Nov. 29, 2016

(54) DEVICE, SYSTEM AND METHOD FOR SELECTING, SHARING AND DISPLAYING ELECTRONIC CONTENT

(75) Inventor: Mihal Lazaridis, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 378 days.

(21) Appl. No.: 12/751,235

(22) Filed: Mar. 31, 2010

(65) Prior Publication Data

US 2011/0113087 A1 May 12, 2011

Related U.S. Application Data

(60) Provisional application No. 61/258,816, filed on Nov. 6, 2009, provisional application No. 61/258,820, filed on Nov. 6, 2009, provisional application No. 61/258,823, filed on Nov. 6, 2009.

(51) Int. Cl.
*G06F 15/16* (2006.01)
*G06F 15/173* (2006.01)
*H04H 20/71* (2008.01)
*H04H 40/00* (2009.01)
(Continued)

(52) U.S. Cl.
CPC ........ *H04W 4/008* (2013.01); *G06F 17/30165* (2013.01); *H04L 67/34* (2013.01); *H04M 1/7253* (2013.01); *H04W 76/022* (2013.01); *H04M 2250/02* (2013.01); *H04M 2250/16* (2013.01); *H04M 2250/64* (2013.01)

(58) Field of Classification Search
CPC ....... H04L 67/00; H04L 67/04; H04L 67/10; H04L 67/025; H04L 67/18; H04L 67/125; H04L 69/329; H04L 41/08; H04L 29/06163; H04L 29/08306; H04L 29/08657; H04L 29/08936; H04L 63/14; H04L 63/20; H04L 63/083; H04L 63/0272; H04L 63/0281; H04L 67/02; H04L 67/16; H04L 67/26; H04L 67/42; H04L 12/2801; H04L 12/5692
USPC ................ 709/203, 206–207, 218, 239, 248; 455/3.01, 3.03–3.06, 41.2, 41.3, 304, 455/466
See application file for complete search history.

(56) References Cited

U.S. PATENT DOCUMENTS 4,855,725 A 8/1989 Fernandez
5,761,485 A 6/1998 Munyan
(Continued)

FOREIGN PATENT DOCUMENTS

EP 1 180 903 2/2002
EP 1209928 5/2002
(Continued)

OTHER PUBLICATIONS

Hane, P.J., "OverDrive introduces digital Kiosk", Information Today, May 1, 2002.
(Continued)

*Primary Examiner* — Farzana Huq
(74) *Attorney, Agent, or Firm* — Jeffrey N. Giunta; Fleit Gibbons Gutman Bongini & Bianco P.L.

(57) ABSTRACT

The present disclosure provides a device, system and method to present electronic content on a first mobile electronic device in communication and configured to receive electronic content from a second electronic device.

15 Claims, 12 Drawing Sheets

(51) Int. Cl.
| | |
|---|---|
| H04B 7/00 | (2006.01) |
| H04B 1/10 | (2006.01) |
| H04W 4/00 | (2009.01) |
| H04W 76/02 | (2009.01) |
| H04L 29/08 | (2006.01) |
| H04M 1/725 | (2006.01) |
| G06F 17/30 | (2006.01) |

(56) References Cited

U.S. PATENT DOCUMENTS

| | | | |
|---|---|---|---|
| 5,970,231 A | 10/1999 | Crandall | |
| 5,986,690 A | 11/1999 | Hendricks | |
| 5,987,499 A * | 11/1999 | Morris et al. | 709/203 |
| 6,144,996 A * | 11/2000 | Starnes et al. | 709/217 |
| 6,295,482 B1 | 9/2001 | Tognazzini | |
| 6,314,474 B1 | 11/2001 | Walter et al. | |
| 6,331,865 B1 | 12/2001 | Sachs et al. | |
| 6,331,867 B1 | 12/2001 | Eberhard et al. | |
| 6,335,678 B1 | 1/2002 | Heutschi | |
| 6,356,287 B1 | 3/2002 | Ruberry et al. | |
| 6,430,599 B1 | 8/2002 | Baker et al. | |
| 6,487,180 B1 | 11/2002 | Borgstahl et al. | |
| RE37,929 E | 12/2002 | Fernandez | |
| 6,532,368 B1 | 3/2003 | Hild et al. | |
| 6,557,173 B1 | 4/2003 | Hendricks | |
| 6,587,866 B1 | 7/2003 | Modi et al. | |
| 6,590,928 B1 | 7/2003 | Haartsen | |
| 6,633,757 B1 | 10/2003 | Hermann et al. | |
| 6,694,359 B1 * | 2/2004 | Morris et al. | 709/219 |
| 6,714,797 B1 | 3/2004 | Rautila | |
| 6,744,753 B2 * | 6/2004 | Heinonen et al. | 370/338 |
| 6,762,775 B2 | 7/2004 | Ho | |
| 6,886,036 B1 | 4/2005 | Santamaki et al. | |
| 6,907,225 B1 * | 6/2005 | Wilkinson | 455/41.2 |
| 6,965,770 B2 | 11/2005 | Walsh et al. | |
| 6,990,464 B1 | 1/2006 | Pirillo | |
| 7,010,267 B2 * | 3/2006 | Vanluijt et al. | 455/41.2 |
| 7,043,548 B2 | 5/2006 | Bouet | |
| 7,103,313 B2 | 9/2006 | Heinonen | |
| 7,124,100 B2 | 10/2006 | Pirillo | |
| 7,149,541 B2 | 12/2006 | Rautila | |
| 7,290,285 B2 | 10/2007 | McCurdy et al. | |
| 7,299,501 B2 | 11/2007 | Hendricks | |
| 7,336,788 B1 | 2/2008 | Hendricks | |
| 7,340,214 B1 | 3/2008 | Hamberg | |
| 7,342,895 B2 | 3/2008 | Serpa et al. | |
| 7,356,347 B1 | 4/2008 | Kammer | |
| 7,359,944 B2 | 4/2008 | An | |
| 7,392,041 B2 | 6/2008 | Brush et al. | |
| 7,401,286 B1 | 7/2008 | Hendricks et al. | |
| 7,403,924 B2 | 7/2008 | Sakamura et al. | |
| 7,406,500 B2 | 7/2008 | Bantz et al. | |
| 7,457,304 B2 | 11/2008 | Roh et al. | |
| 7,474,874 B2 | 1/2009 | Lahetkangas et al. | |
| 7,509,270 B1 | 3/2009 | Hendricks et al. | |
| 7,577,496 B2 | 8/2009 | Walker et al. | |
| 7,584,269 B2 | 9/2009 | Moore et al. | |
| 7,590,086 B2 | 9/2009 | Olkkonen et al. | |
| 7,600,137 B2 | 10/2009 | Trappeniers et al. | |
| 7,773,977 B2 | 8/2010 | Tominaga | |
| 7,778,675 B1 | 8/2010 | Righi | |
| 8,208,960 B2 | 6/2012 | Rajan et al. | |
| 8,385,896 B2 * | 2/2013 | Proctor et al. | 455/414.3 |
| 2002/0022453 A1 | 2/2002 | Balog et al. | |
| 2002/0028690 A1 | 3/2002 | McKenna et al. | |
| 2002/0035697 A1 | 3/2002 | McCurdy et al. | |
| 2002/0087662 A1 | 7/2002 | Bouet | |
| 2002/0093923 A1 | 7/2002 | Bouet | |
| 2002/0103833 A1 | 8/2002 | Parry | |
| 2002/0120635 A1 | 8/2002 | Joao | |
| 2002/0194601 A1 | 12/2002 | Perkes et al. | |
| 2003/0187954 A1 | 10/2003 | Wen et al. | |
| 2003/0191818 A1 | 10/2003 | Rankin et al. | |
| 2004/0171378 A1 | 9/2004 | Rautila | |
| 2004/0179545 A1 | 9/2004 | Erola et al. | |
| 2004/0179687 A1 | 9/2004 | Lai et al. | |
| 2004/0203381 A1 | 10/2004 | Cahn et al. | |
| 2004/0204063 A1 | 10/2004 | VanErlach | |
| 2004/0242216 A1 | 12/2004 | Boutsikakis | |
| 2005/0009470 A1 | 1/2005 | Kim | |
| 2005/0064896 A1 | 3/2005 | Rautiola et al. | |
| 2005/0125831 A1 * | 6/2005 | Blanchard | G06F 17/30017 725/81 |
| 2005/0198029 A1 | 9/2005 | Pohja et al. | |
| 2005/0210391 A1 | 9/2005 | Othmer | |
| 2006/0004764 A1 * | 1/2006 | Kurhekar et al. | 707/10 |
| 2006/0026265 A1 | 2/2006 | Russell et al. | |
| 2006/0085351 A1 * | 4/2006 | Hug | G06F 21/10 705/59 |
| 2006/0112074 A1 | 5/2006 | Han | |
| 2006/0166617 A1 * | 7/2006 | Passmore | 455/3.06 |
| 2006/0168231 A1 | 7/2006 | DiPerna | |
| 2006/0178110 A1 | 8/2006 | Nurminen et al. | |
| 2006/0193448 A1 | 8/2006 | Donoghue et al. | |
| 2006/0229014 A1 | 10/2006 | Harada et al. | |
| 2006/0253525 A1 | 11/2006 | Slota | |
| 2006/0256074 A1 | 11/2006 | Krum et al. | |
| 2006/0262785 A1 * | 11/2006 | Duggal | H04L 67/04 370/389 |
| 2007/0211573 A1 | 9/2007 | Hermansson | |
| 2007/0240030 A1 | 10/2007 | Cronstrom | |
| 2007/0293271 A1 | 12/2007 | Streeter | |
| 2008/0008140 A1 * | 1/2008 | Forssell | 370/338 |
| 2008/0059481 A1 | 3/2008 | Kunimatsu et al. | |
| 2008/0079573 A1 | 4/2008 | Bloebaum et al. | |
| 2008/0082903 A1 | 4/2008 | McCurdy et al. | |
| 2008/0102817 A1 | 5/2008 | Shenassa et al. | |
| 2008/0109317 A1 | 5/2008 | Singh | |
| 2008/0113614 A1 | 5/2008 | Rosenblatt | |
| 2008/0195735 A1 | 8/2008 | Hodges et al. | |
| 2008/0215895 A1 | 9/2008 | Hendricks et al. | |
| 2008/0222552 A1 | 9/2008 | Batarseh et al. | |
| 2008/0229182 A1 | 9/2008 | Hendricks et al. | |
| 2008/0248740 A1 * | 10/2008 | Lazovsky | G06Q 30/06 455/3.01 |
| 2008/0261526 A1 * | 10/2008 | Suresh | 455/41.2 |
| 2008/0267191 A1 | 10/2008 | Smitheimer et al. | |
| 2008/0278290 A1 | 11/2008 | Ban et al. | |
| 2008/0318196 A1 | 12/2008 | AlKabaz et al. | |
| 2009/0011799 A1 | 1/2009 | Douthitt et al. | |
| 2009/0017750 A1 | 1/2009 | Marcinkiewicz | |
| 2009/0043783 A1 | 2/2009 | Wakasa et al. | |
| 2009/0047903 A1 | 2/2009 | Eisenbach | |
| 2009/0055554 A1 | 2/2009 | Moore et al. | |
| 2009/0061769 A1 | 3/2009 | Zimbric et al. | |
| 2009/0062939 A1 | 3/2009 | Park | |
| 2009/0063293 A1 | 3/2009 | Mirrashidi et al. | |
| 2009/0088077 A1 | 4/2009 | Brown et al. | |
| 2009/0111378 A1 | 4/2009 | Sheynman et al. | |
| 2009/0176481 A1 | 7/2009 | Hamilton et al. | |
| 2009/0177810 A1 | 7/2009 | Kweon et al. | |
| 2009/0209202 A1 | 8/2009 | Martini et al. | |
| 2009/0216623 A1 | 8/2009 | Hendricks et al. | |
| 2009/0253466 A1 | 10/2009 | Saito et al. | |
| 2009/0264070 A1 | 10/2009 | Lim | |
| 2009/0325630 A1 | 12/2009 | Titola et al. | |
| 2010/0057781 A1 * | 3/2010 | Stohr | 707/104.1 |
| 2010/0062714 A1 | 3/2010 | Ozaki | |
| 2010/0067631 A1 * | 3/2010 | Ton | H04L 12/5895 375/358 |
| 2010/0070931 A1 | 3/2010 | Nichols | |
| 2010/0076926 A1 | 3/2010 | Lecciso et al. | |
| 2010/0100310 A1 | 4/2010 | Eich et al. | |
| 2010/0156812 A1 | 6/2010 | Stallings et al. | |
| 2010/0332610 A1 * | 12/2010 | Cherian et al. | 709/207 |
| 2011/0010458 A1 | 1/2011 | Das et al. | |
| 2011/0093521 A1 * | 4/2011 | Georgis et al. | 709/203 |
| 2012/0290653 A1 * | 11/2012 | Sharkey | 709/204 |

FOREIGN PATENT DOCUMENTS

| | | |
|---|---|---|
| EP | 1 659 508 | 5/2006 |
| WO | WO0147248 | 6/2001 |
| WO | WO 03/033209 | 4/2003 |

(56) References Cited

FOREIGN PATENT DOCUMENTS

| WO | WO2006/038200 | 4/2006 |
|---|---|---|
| WO | WO 2006/043977 | 4/2006 |
| WO | WO2006/127543 | 11/2006 |
| WO | WO2008/079889 | 7/2008 |
| WO | WO 2009/089308 | 7/2009 |
| WO | WO2009/111856 A1 | 9/2009 |
| WO | WO2009/132095 A2 | 10/2009 |

OTHER PUBLICATIONS www.InternetRetailer.com, "Digital Kiosks Enable All Publishers and Retailers to Sell Protected eBook and Audio Content", OverDrive press release, Mar. 29, 2002.

www.palm.com, "Palm Digital Media and OverDrive, Inc. Announce Plans for Global distribution of Palm Reader eBooks for Handheld Devices", Palm press release, Apr. 30, 2002.

Bassoli et al., "tunA: Synchronised Music-Sharing on Handheld Devices", Ubicomp 2004, Nottingham, UK, Sep. 7-10, 2004.

Haartsen, J.C., "Bluetooth®: A new radio interface providing ubiquitous connectivity", Vehicular Technology Conf. Proc. 2000, Tokyo, 2000 IEEE $51^{st}$ vol. 1, May 15-18, 2000, pp. 107-111.

Johansson, P., et al., "Bluetooth®: An Enabler for Personal Area Networking", IEEE Network, vol. 15, Issue 5, Sep./Oct. 2001, pp. 28-37.

Khan J.Y., et al., "Bluetooth®-Based Wireless Personal area Network for Multimedia Communication", Proc. of the first IEEE Intn'l Workshop on Electronic Design, Test and Applications (Delta '02), Christchurch, NZ, Jan. 29-31, 2002.

Jung S., "BlueTorrent: Cooperative Content Sharing for Bluetooth® Users", Proceedings of the Fifth Annual IEEE International Conf. on Pervasive Computing and Communications (PerCom'07), Mar. 19-23, 2007, pp. 47-56.

Melodeo Unveils Peer-to-Peer Music Sharing Functionality; Users Can Now Pay for and Share Full-track Downloads Legally and Securely from Mobile Phone to Mobile Phone, Business Wire, NY, Feb. 10, 2005.

LeBrun J., et al., "Bluetooth® Content Distribution Stations on Public Transit", MobiShare'06, Los Angeles, CA, Sep. 25, 2006, pp. 63-65.

Baumann et al., "BluetunA: Let Your Neighbour Know What Music You Like", CHI 2007, San Jose, CA, Apr. 28-May 3, 2007, pp. 1941-1946.

Ghini, V., et al., "Smart Download on the Go: A Wireless Internet Application for Music Distribution Over Heterogeneous Networks", 2004 IEEE Int'l Conf. on Communications, vol. 1, Jun. 20-24, 2004, pp. 73-79.

Bassoli et al., "BluetunA: music sharing through mobile phones", Third Int'l Workshop on Mobile Music Technology 2006, Sussex, UK, Mar. 2-3, 2006.

Personal area network—Definition from Whatis.com, Jan. 1, 2001.

Research in Motion Limited et al., PCT ISR and Written Opinion, PCT Appl. No. PCT/CA2010/000452, CIPO, Nov. 17, 2010.

Research in Motion Limited et al., PCT ISR and Written Opinion, PCT Appl. No. PCT/CA2010/000453, CIPO, Jul. 12, 2010.

Research in Motion Limited et al., PCT ISR and Written Opinion, PCT Appl. No. PCT/CA2010/000454, CIPO, Jul. 13, 2010.

Research in Motion Limited et al., PCT ISR and Written Opinion, PCT Appl. No. PCT/CA2010/000455, CIPO, Aug. 5, 2010.

Extended European Search Report, EP Appl. 10827741.9, EPO, Jul. 21, 2014.

Extended European Search Report, EP Appl. 10827740.1, EPO, Jul. 21, 2014.

Extended European Search Report, EP Appl. 10827742.7, EPO, Oct. 28, 2014.

European Examination Report dated Jun. 21, 2016, received for European Application No. 10827742.7.

* cited by examiner

DEVICE, SYSTEM AND METHOD FOR SELECTING, SHARING AND DISPLAYING ELECTRONIC CONTENT

PRIORITY CLAIM

This application claims priority to U.S. Provisional Patent Application No. 61/258,816 filed Nov. 6, 2009, U.S. Provisional Patent Application No. 61/258,820 filed Nov. 6, 2009, U.S. Provisional Patent Application No. 61/258,823 filed Nov. 6, 2009, which are hereby incorporated herein by reference.

CROSS-REFERENCE TO RELATED APPLICATIONS

The present application is related to the following U.S. applications commonly owned together with this application by Research in Motion Limited:

This application is related to U.S. patent applications: application Ser. No. 12/751,170; application Ser. No. 12/751,186; and application Ser. No. 12/751,215, each filed on even date herewith, which are incorporated herein in their entireties.

TECHNICAL FIELD

The present disclosure relates generally to mobile electronic devices, and more particularly to a device, system and method for selecting, sharing and displaying electronic content.

BACKGROUND

Mobile electronic devices, such as cellular phones, personal digital assistants (PDAs), or laptop computers are increasingly becoming popular. Some mobile electronic devices are capable of communicating with a network such as a cellular network. Some mobile electronic devices are capable of data communications and can therefore download electronic content.

Improvements in mobile electronic devices are desirable.

BRIEF DESCRIPTION OF THE DRAWINGS

Example embodiments of the present disclosure will be described below with reference to the included drawings such that like reference numerals refer to like elements and in which.

DETAILED DESCRIPTION OF EXAMPLE EMBODIMENTS

Figure 1:
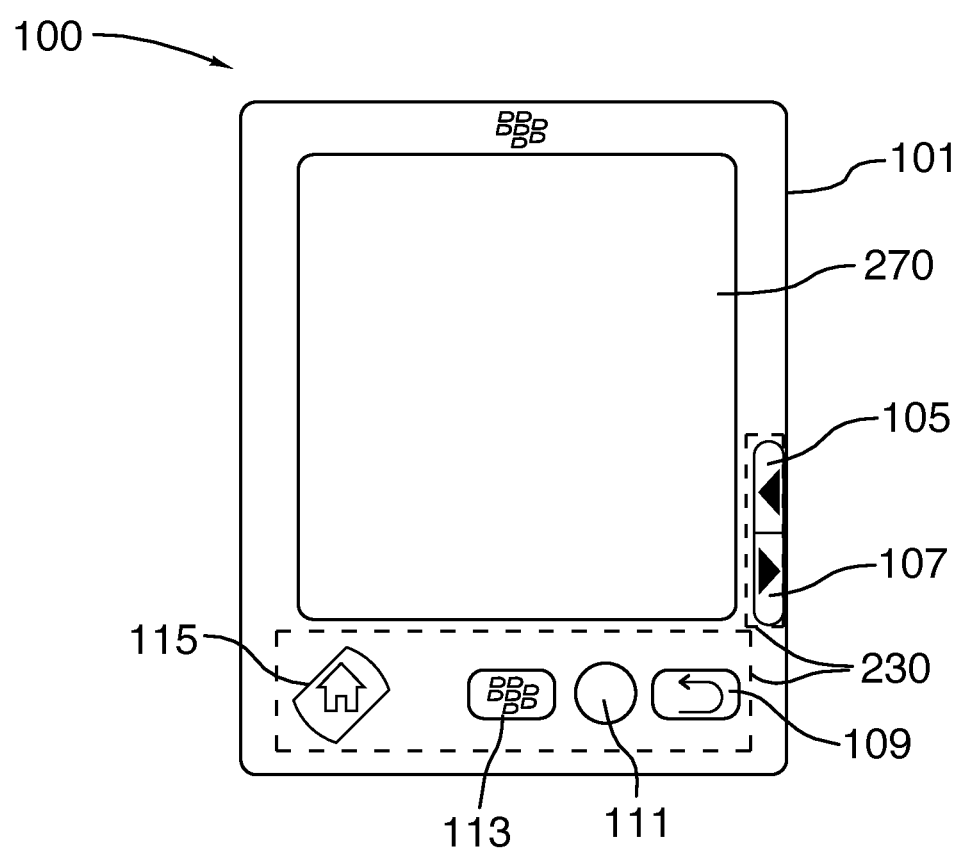
FIG. 1 is an illustration of a first mobile electronic device in accordance with an example embodiment of the present disclosure.

Mobile electronic devices, such as cellular phones, PDAs, or laptop computers are increasingly becoming ubiquitous. Some mobile electronic devices are capable of data communications. For example, some mobile electronic devices are equipped with wireless communications functionalities enabling these devices to connect to mobile data networks such as cellular networks, wireless local area networks (WLANs), personal area networks (PANs) such as Bluetooth™, and the like. As is known, Bluetooth™ references a wireless protocol for exchanging data over short distances using short length radio waves, thus creating personal area networks (PANs). Mobile electronic devices download electronic content such as electronic books, videos, music, multimedia, and the like either through mobile data networks, or by other means such as wired networks, serial connections, or memory sticks.

Recently, the use of electronic content over physical content has gained popularity. This is partly due to the convenience of downloading electronic content from home versus purchasing physical copies of movies, music, or books from a brick-and-mortar store. Another reason is portability. As an example, a number of books are now available in electronic format, which can be downloaded and stored on a PDA for example. Accordingly, with the popularity of mobile electronic devices, particularly ones which are capable of data communications, more electronic content is being downloaded to mobile electronic devices. However, due to the small size of most mobile electronic devices, particularly the size of the display, some content is not conveniently viewable on such devices. For example, reading electronic books, viewing photos, or watching videos on a mobile electronic device with a small display cause the eyes to strain.

A class of mobile electronic devices with large screens has been developed for the purpose of viewing visual electronic content such as electronic books. However, due to their large size, they are not practical to carry around everywhere in the same manner that smaller mobile electronic devices such as cellular phones and personal digital assistants are.

There is a need for a device, system and method that combines the advantages of full-featured mobile electronic devices and mobile electronic devices having large screens.

In accordance with certain embodiments of the present disclosure, there is provided a method for presenting electronic content on a mobile electronic device having a processor coupled with an input subsystem, an output subsystem, a short-range communication subsystem and a memory, the method comprising: the mobile electronic device presenting a list of electronic-content-items via the output subsystem; the mobile electronic device receiving a selection for an electronic-content-item in the list via the input subsystem; and the mobile electronic device requesting the electronic-content-item via the short-range communication subsystem.

In accordance with yet other embodiments of the present disclosure, there is provided a mobile electronic device for presenting electronic content, the mobile electronic device comprising: a processor; an input subsystem coupled with the processor; an output subsystem coupled with the processor; a short-range communication subsystem coupled with the processor; and a memory storing one or more subroutines executable by the processor, the one or more routines being adapted to: present a list of electronic-content-items via the output subsystem; receive a selection for an electronic-content-item in the list via the input subsystem; and request the electronic-content-item via the short-range communication subsystem.

In yet other embodiments of the present disclosure there is provided a system for presenting electronic content, the system comprising: a first mobile electronic device having a first short-range communications subsystem; a second mobile electronic device having a second short-range communication subsystem; and the first short-range communication subsystem being operable to electronically couple with the second short-range communication subsystem for allowing the transfer of electronic content from the second mobile electronic device to the first mobile electronic device.

In yet other embodiments of the present disclosure, there is provided a system for presenting electronic content, the system comprising: a first mobile electronic device having a first short-range communication subsystem; a second mobile electronic device having a second short-range communication subsystem and a first communication subsystem for long-range communication; the first communication subsystem of the second mobile electronic device operable to communicate with a wide area network; and a content server operable to electronically communicate with the wide area network.

In accordance with certain embodiments of the present disclosure, there is provided a method for providing electronic content, the method comprising: presenting a list of a plurality of selectable electronic-content-items available for downloading to a first mobile electronic device; receiving a request for one or more selected electronic-content-items of the plurality of selectable electronic-content-items; in response to receiving the request, a second mobile electronic device retrieving the one or more selected electronic-content-items; and the second mobile electronic device transmitting the one or more selected electronic-content-items to the first mobile electronic device via a short-range wireless connection between the first and second mobile electronic devices.

In accordance with certain embodiments of the present disclosure, there is provided a mobile electronic device, comprising: a processor; a short-range communications subsystem coupled to and in cooperative arrangement with the processor; a long-range communications subsystem coupled to and in cooperative arrangement with the processor; wherein in response to a query received by the mobile electronic device, the mobile electronic device presents a list of a plurality of selectable electronic-content-items available for downloading, and wherein in response to a request received by the mobile electronic device for one or more selected electronic-content-items of the plurality of selectable electronic-content-items, the mobile electronic device retrieves the one or more selected electronic-content-items and the short-range communications subsystem transmits the one or more selected electronic-content-items via a short-range wireless connection.

In accordance with embodiments of the present invention, there is provided a method for providing electronic content, the method comprising: establishing a short-range wireless connection between a first mobile electronic device and a second mobile electronic device; the second mobile electronic device presenting a list of a plurality of selectable electronic-content-items available for downloading to the first mobile electronic device; the second mobile electronic device receiving a request for one or more selected electronic-content-items of the plurality of selectable electronic-content-items; the second mobile electronic device retrieving the one or more selected electronic-content-items; and the second mobile electronic device transmitting via the short-range wireless connection the one or more selected electronic-content-items to the first mobile electronic device.

In accordance with embodiments of the present invention, there is provided a system for presenting electronic content, comprising: a first mobile electronic device having a first processor, a first short-range communications subsystem coupled to the first processor, and a first display coupled to the first processor; and a second mobile electronic device having a second processor, a second short-range communications subsystem coupled to the processor, a long-range communications subsystem coupled to the processor, and a second display coupled to the second processor, wherein a short-range wireless connection is established between the first and second short-range communications subsystems of the first and second mobile electronic devices; wherein the second mobile electronic device presents a list of a plurality of selectable electronic-content-items available for downloading to the first mobile electronic device, and wherein in response to a request for one or more selected electronic-content-items received by the second mobile electronic device, the second mobile electronic device retrieves the one or more selected electronic-content-items and the second short-range communications subsystem of the second mobile electronic device transmits the one or more selected electronic-content-items to the first mobile electronic device via the short-range wireless connection.

FIG. 1 is an illustration of a first mobile electronic device 100 in accordance with an example embodiment of the present disclosure. The first mobile electronic device 100 has a housing 101 which holds a large display 270, such as a Liquid Crystal Display (LCD), suitable for viewing visual electronic content such as electronic books, photos, videos, and the like. The first mobile device 100 includes an input subsystem 230 comprising a plurality of keys 105, 107, 109, 111, 113, and 115, located in the housing 101 performing functions. For example, menu key 113 is used to cause the electronic mobile device 100 render on display 270 a graphical user interface (GUI) (not shown), action key 111 is used to initiate an action by activating an element from the GUI, and escape key 109 is used to cancel the last action performed or return to a previous screen on the GUI.

Navigation keys 107 and 105 are used, for example, to navigate forwards and backwards within content viewed on display 270, respectively. As an example, keys 107 and 105 are used to flip pages when viewing an electronic book, to navigate to a different scene in video content, or to select a different audio track to play. The home key 115 causes the mobile electronic device 100 to render on display 270 a default home screen (not shown). Mobile electronic device 100 also comprises a speaker (not shown) for playing back audio content, the audio component of video content, or audio produced by text-to-speech of text content, multimedia, and the like.

In some example embodiments, display 270 is a touchscreen and the plurality of keys 105, 107, 109, 111, 113, and 115 are soft keys or icons displayed on display 270 and actuated by a human finger or a stylus.

Figure 2:
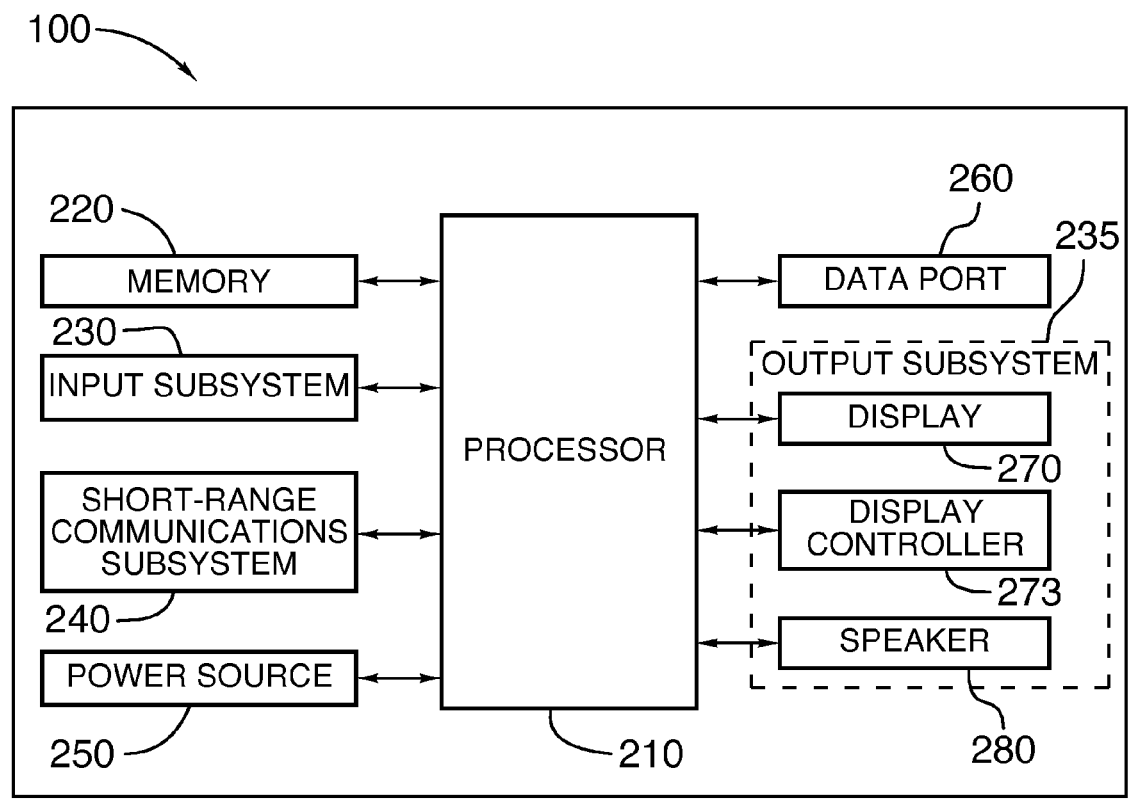
FIG. 2 is a block diagram representation of the example first mobile electronic device of FIG. 1.

FIG. 2 is a block diagram representation of the example first mobile electronic device 100 of FIG. 1. As shown in FIG. 2, first mobile electronic device 100 has a processor 210 that controls the overall operation of the first mobile electronic device 100. Short-range communications subsystem 240, such as a Blueooth™ subsystem, is coupled to processor 210 provides short-range communications capability used for sending and receiving electronic content at mobile electronic device 100. A data port 260, such as a Universal Serial Bus (USB) port, is used for sending and receiving electronic content at mobile electronic device 100. Memory 220 may be a Flash memory chip and contains an operating system and other software modules subroutines utilized by processor 210 to operate first mobile electronic device 100. Memory 220 also contains modules for carrying out the methods of the present disclosure, as will be described below. First mobile electronic device 100 also includes an input subsystem 230 for controlling the device, navigating through content, selecting content to playback, and the like. Input subsystem 230 includes, for example, keys 105, 107, 109, 111, 113, and 115 described above. In some example embodiments, input subsystem 230 comprises a touchpad, a trackball, a roller wheel, a touch screen with or without a stylus, or any other suitable input device.

A power source 250, such as a battery, is used to power up the processor 210, memory 220, and other subsystems on first mobile electronic device 100. In some embodiments, power source 250 is a power supply connector, a fuel cell, a solar cell, or any other suitable power source.

Display 270 of output subsystem 235 is, for example, a LCD coupled to processor 210 and displays electronic content as described above. In some example embodiments, display 270 is light emitting diode (LED) display, a plasma display, an electronic ink display (e-ink), a Thin Film Transistor (TFT) LCD, or any other suitable display type. Operation of Display 270 is controlled by display controller 273.

First mobile electronic device 100 also has speaker 280 for playing back audio content, the audio component of video content, or audio produced by text-to-speech of text content, and the like.

In some example embodiments, short-range communications subsystem 240 is a wireless local area network (WLAN) subsystem, an Infra Red Data Association (IrDA) subsystem, or a ZigBee™ subsystem. Other short-range communications subsystems would also be apparent to those of skill in the art.

In some example embodiments, data port 260 is a serial port according to the RS-232 specifications, an IEEE1394 FireWire port, an optical connection, a local area network (LAN) connection such as Ethernet, or any other suitable data communications port.

In some example embodiments, memory 220 is a Random Access Memory (RAM), a serial electrically erasable programmable read only memory (SEEPROM), a removable secure digital (SD) card, a removable compact flash card, a USB flash drive, or any other suitable memory module as would be apparent to those of skill in the art.

Figure 3:
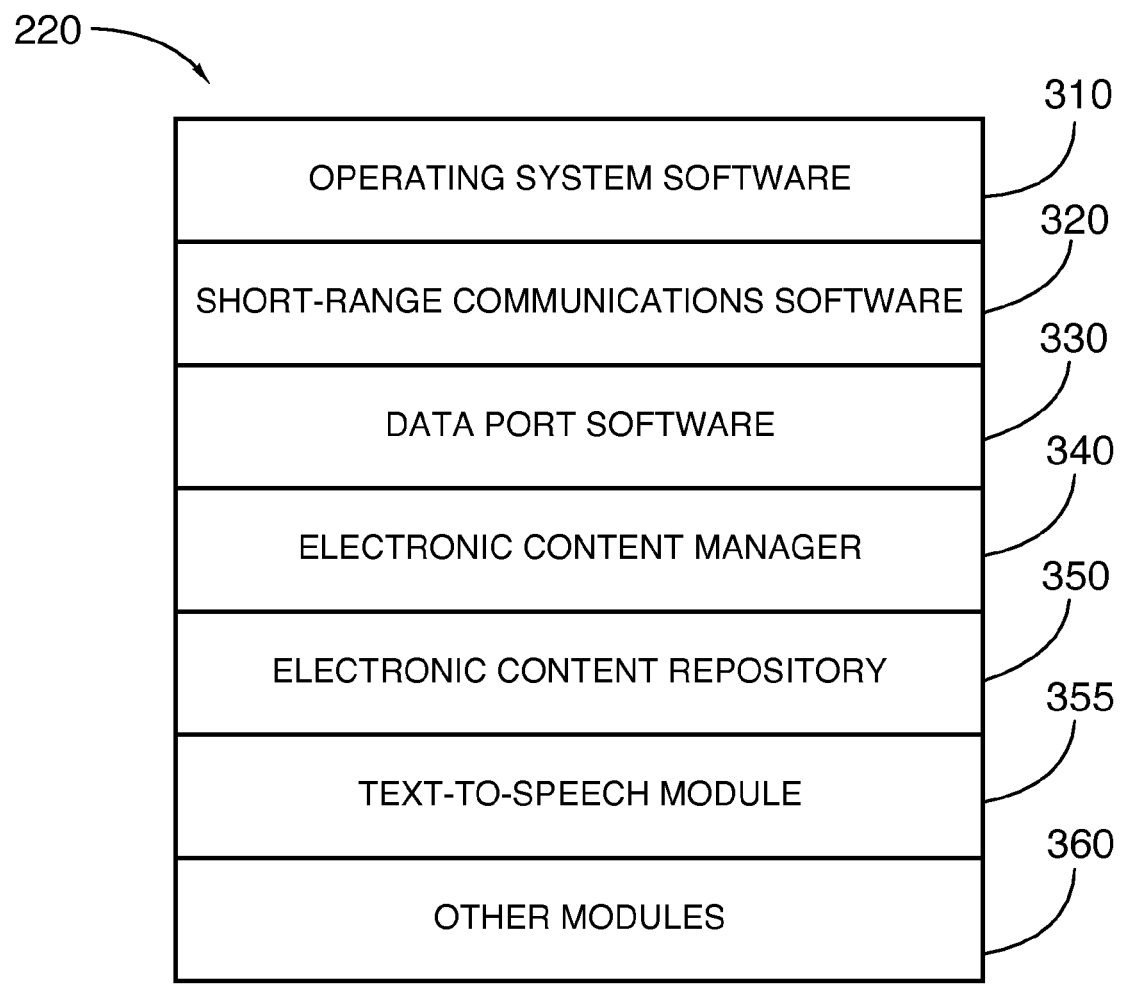
FIG. 3 is an illustration of example software modules stored in the memory of the first mobile electronic device shown in FIG. 2.

FIG. 3 is an illustration of example software modules subroutines stored in memory 220 and executable by processor 210 of first mobile electronic device 100 in accordance with an example embodiment of the present disclosure. Operating system software 310 performs the function of a conventional embedded operating system including starting up the mobile electronic device, and scheduling for execution the various other software modules in memory 220.

Short-range communications software 320 interacts with short-range communications subsystem 240 to provide short-range communications capability to other software modules stored in memory 220 of first mobile electronic device 100. In the presently described example embodiment, the short-range communications subsystem 240 is a Blueooth™ subsystem, and short-range communications software 320 is a Bluetooth™ driver. The mobile electronic device 100 shares electronic content and communicates with other devices such as personal computers, laptop computers, PDAs, smart phones, and the like using the short-range communications 240. Data port software 330 interacts with data port 260 to provide communications capabilities between first mobile electronic device 100 and other devices, over data port 260. In one example embodiment, data port 260 is a USB port, and data port software 330 is a USB driver. Communications capabilities provided by data port 260 are used for sharing electronic content and information regarding electronic content, between first mobile electronic device 100 and other devices such as personal computers, laptop computers, PDAs, smart phones, and the like.

Electronic content manager 340 enables device 100 to select receive, and display electronic content. In one example embodiment, electronic content manager 340 displays a GUI on display 270 for allowing users to, for example, select, receive, and display electronic content.

Electronic content repository 350 resides in memory 220 and stores electronic content, such as electronic books, videos, music, multimedia, photos, and the like.

Text-to-speech module 355 converts textual content, such as electronic books, to audio content for listening. Other software modules 360 reside on memory 220 for performing miscellaneous functions on mobile electronic device 100.

Figure 4:
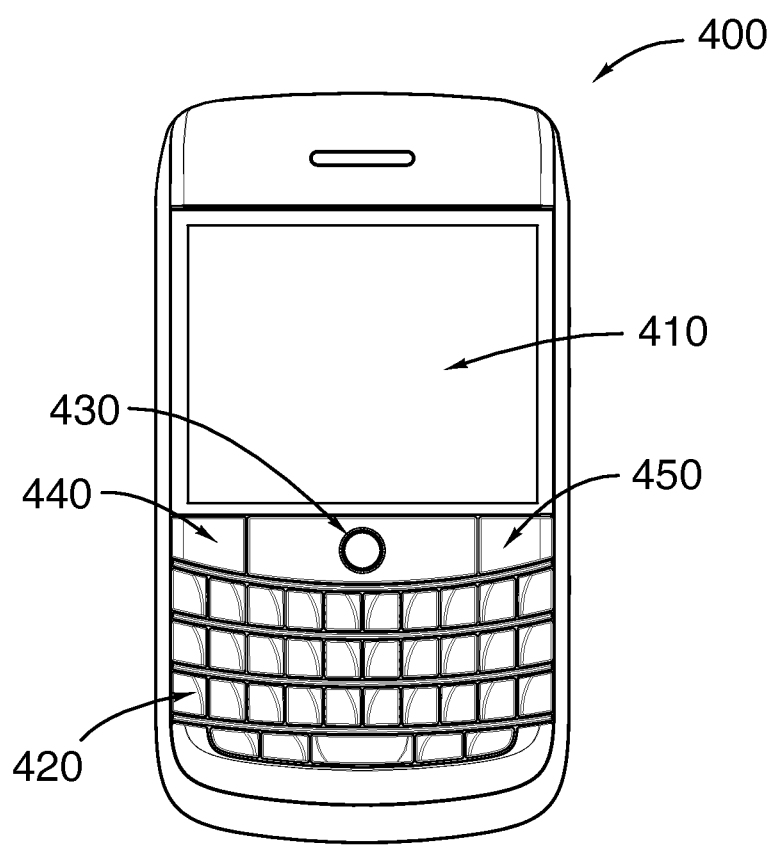
FIG. 4 is an illustration of a second mobile electronic device in accordance with an example embodiment of the present disclosure.

FIG. 4 is an illustration of a second mobile electronic device 400 in accordance with an example embodiment of the present disclosure. Second mobile electronic device 400 has a screen 410 for displaying information, a keyboard 420 for entering information such as composing e-mail messages, and a pointing device 430 such as a trackball, trackwheel, touchpad, and the like, for navigating through items on screen 410. In this example embodiment, device 400 also has a button 440 for initiating a phone application (not shown), and a button 450 for terminating phone calls.

Figure 5:
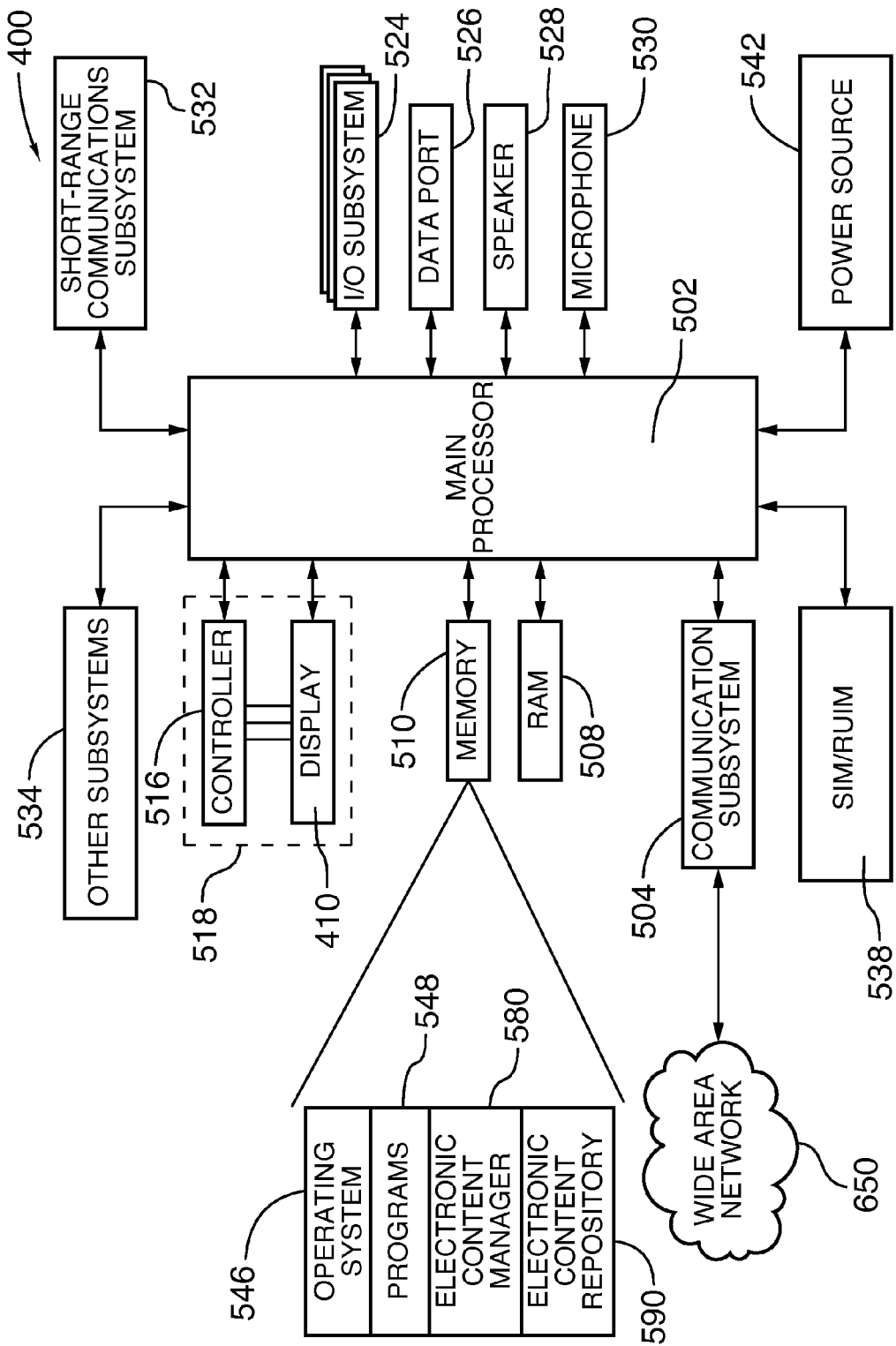
FIG. 5 is a block diagram representation of the second mobile electronic device of FIG. 4 in accordance with an example embodiment of the present disclosure.

FIG. 5 is a block diagram of an example functional representation of the second mobile electronic device 400 of FIG. 4 in accordance with an example embodiment of the present disclosure. Second mobile electronic device 400 includes multiple components, such as a processor 502 that controls the overall operation of second mobile electronic device 400. Communication functions, including data and voice communications, are performed through a communication subsystem 504. Communication subsystem 504 receives data from and sends data to a wireless wide area network 650 in long-range communication. An example of the data sent or received by the communication subsystem includes but is not limited to e-mail messages, short messaging system (SMS), web content, and electronic content. The wireless network 650 is, for example, a cellular network. In some example embodiments, network 650 is a WiMax™ network, a wireless local area network (WLAN) connected to the Internet, or any other suitable communications network. In other example embodiments, other wireless networks are contemplated, including, but not limited to, data wireless networks, voice wireless networks, and networks that support both voice and data communications.

A power source 542, such as one or more rechargeable batteries, a port to an external power supply, a fuel cell, or a solar cell powers second mobile electronic device 400.

The processor 502 interacts with other functional components, such as Random Access Memory (RAM) 508, memory 510, a display screen 410 (such as, for example, a LCD) which is operatively connected to an electronic controller 516 so that together they comprise a display subsystem 518, an input/output (I/O) subsystem 524, a data port 526, a speaker 528, a microphone 530, short-range communications subsystem 532, and other subsystems 534. It will be appreciated that the electronic controller 516 of the display subsystem 518 need not be physically integrated with the display screen 410.

The auxiliary I/O subsystems 524 could include input devices such as one or more control keys, a keyboard or keypad, navigational tool (input device), or both. The navigational tool could be a clickable/depressible trackball or scroll wheel, or touchpad. User-interaction with a graphical user interface is performed through the I/O subsystem 524.

Second mobile electronic device 400 also includes one or more clocks including a system clock (not shown) and sleep clock (not shown). In other embodiments, a single clock operates as both system clock and sleep clock. The sleep clock is a lower power, lower frequency clock.

To identify a subscriber for network access, second mobile electronic device 400 uses a Subscriber Identity Module or a Removable User Identity Module (SIM/RUIM) card 538 for communication with a network, such as the wireless network 650. Alternatively, user identification information is programmed into memory 510.

Second mobile electronic device 400 includes an operating system 546 and software programs, subroutines or components 548 that are executed by the processor 502 and are typically stored in a persistent, updatable store such as the memory 510. In some example embodiments, software programs 548 include, for example, personal information management applications, communications applications, messaging applications, games, and the like.

An electronic content manager 580 is included in memory 510 of device 400. Electronic content manager 580 enables device 400 to fetch, download, send, receive, and display electronic content as will be described in detail below.

An electronic content repository 590 is also included in memory 510 of device 400. The electronic content repository or database, 590 stores electronic content such as electronic books, videos, music, multimedia, photos, and the like.

Additional applications or programs are be loaded onto second mobile electronic device 400 through data port 526, for example. In some embodiments, programs are loaded over the wireless network 650, the auxiliary I/O subsystem 524, the short-range communications subsystem 532, or any other suitable subsystem 534.

Figure 6:
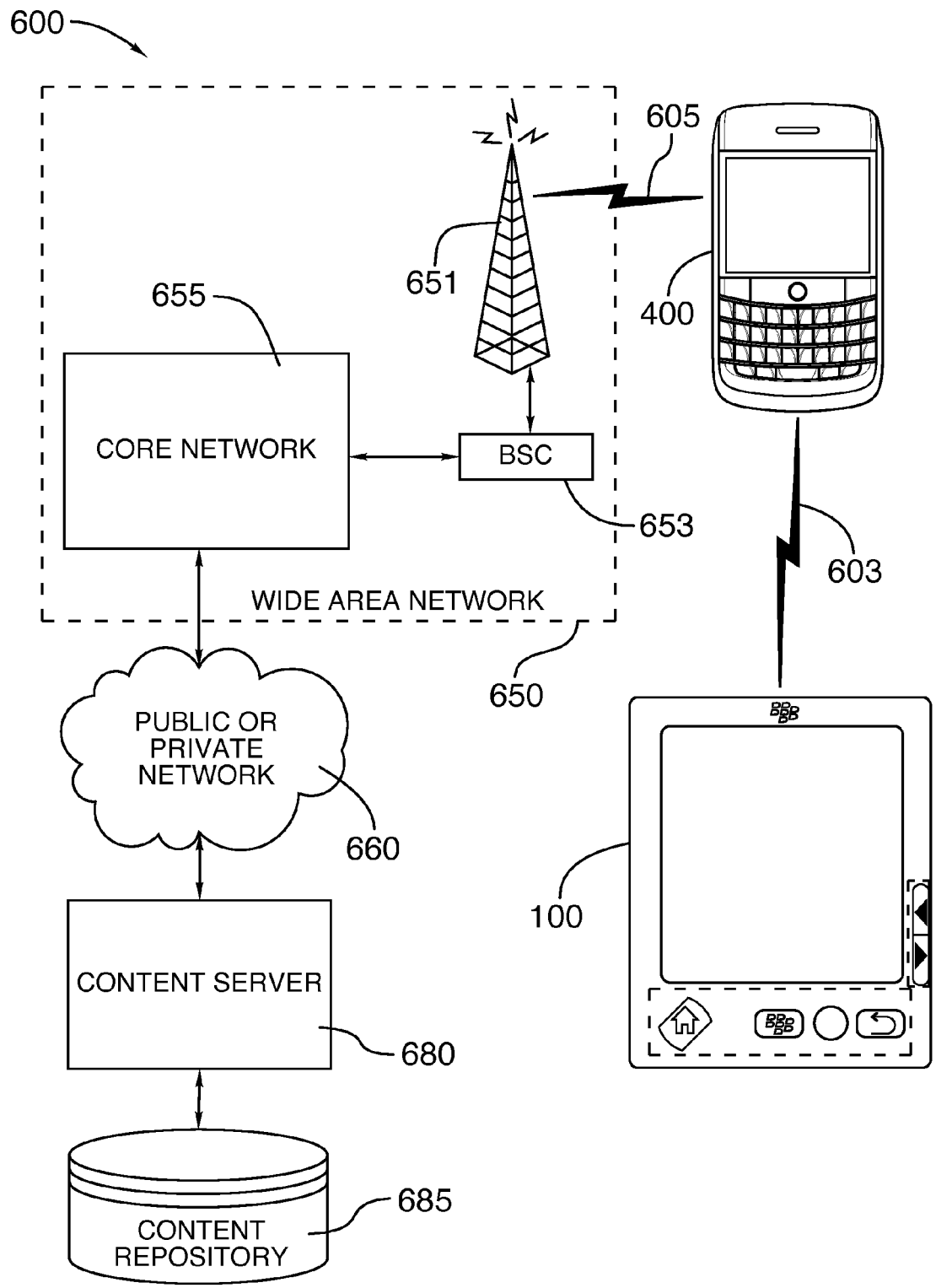
FIG. 6 is an illustration of a network system including the first mobile electronic device of FIG. 1 and the second mobile electronic device of FIG. 4, in accordance with an example embodiment of the present disclosure.

FIG. 6 is an illustration of an example network system 600 including first mobile electronic device 100 and second mobile electronic device 400, in accordance with an example embodiment of the present disclosure. First mobile electronic device 100 and second mobile electronic device 400 are operatively connected to one another over a short-range wireless connection 603. For example, short-range wireless connection 603 is a Bluetooth™ connection. In addition, second mobile electronic device 400 has a long-range wireless connection 605 with a wide area network 650. In this embodiment, the wide area network 650 comprises a plurality of base stations. For simplicity, only base station 651 is shown. Base station 651 is operatively connected to a base station controller 653, which in turn is connected to core network 655. Core network 655 is connected to network 660, which may be a public network such as the Internet, or a private corporate network. Second mobile electronic device 400 establishes a wireless connection 605 with base station 651 and accordingly second mobile electronic device 400 has access to public network 660 and is able to exchange data with various entities connected to public network 660, such as content server 680.

Content server 680 provides access to devices 100 and 400 to content repository 685. Content repository 685 has electronic content stored thereon, the content being available for download by desktop computers, laptop computers, mobile electronic devices, and the like. Electronic content stored on content repository 685 includes electronic books, videos, music, photos, and the like. Clients download content from the content repository 685 by making requests to content server 680 with an appropriate subscription, or for free if the downloaded content is in the public domain. Device 400 downloads electronic content from server 680 and content repository 685, over the wireless connection 605. In an example embodiment, mobile electronic device 400 shares downloaded electronic content with other devices, such as first mobile electronic device 100, over the short-range wireless connection 603.

Figure 7:
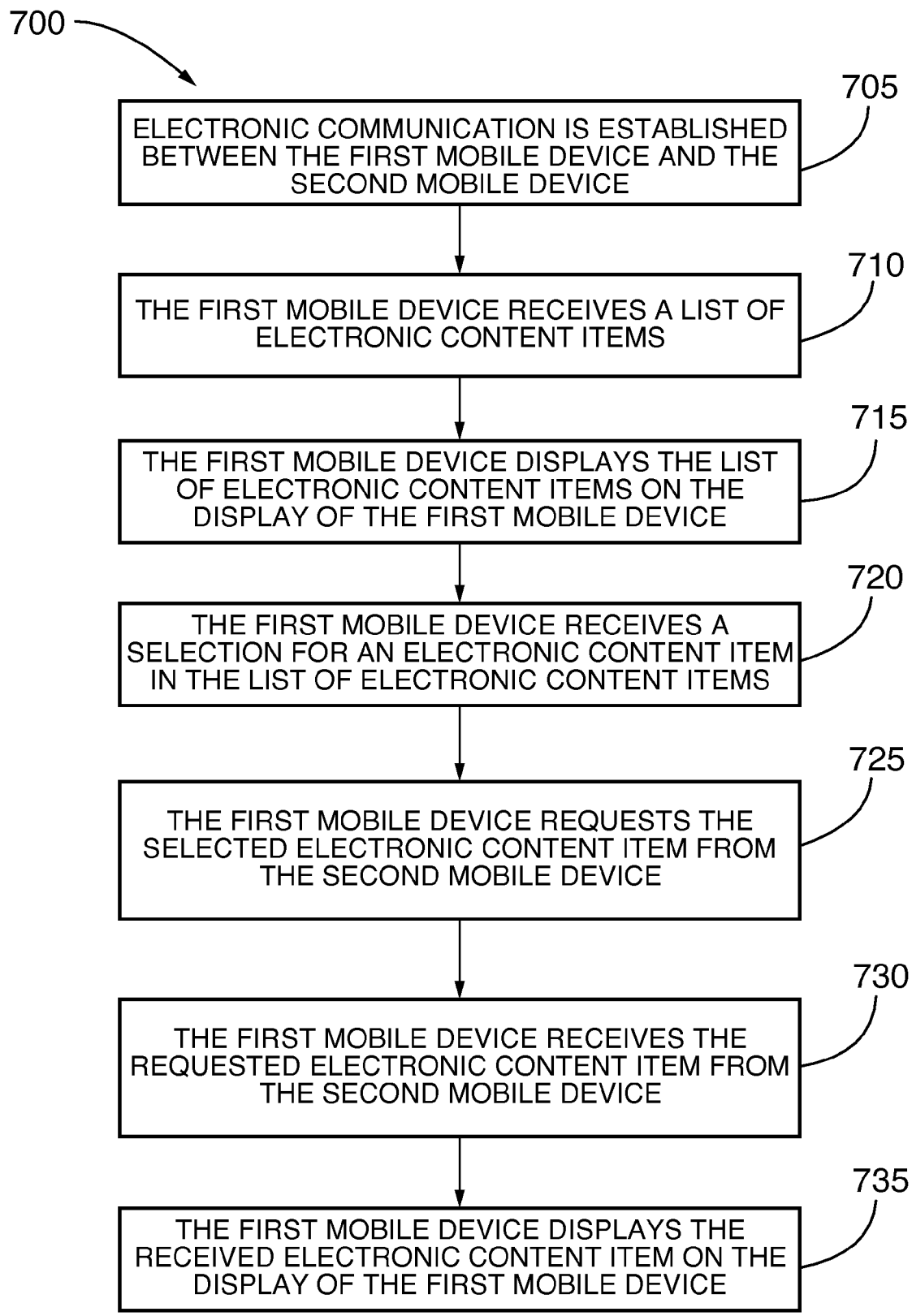
FIG. 7 is a flow chart of a method for execution on the first mobile electronic device of FIG. 1, the method for selecting, receiving, and displaying electronic content, in accordance with an example embodiment of the present disclosure.

FIG. 7 is a flow chart of a method 700 for execution on first mobile electronic device 100, the method for receiving and displaying electronic content in accordance with an example embodiment of the present disclosure. Method 700 is carried out, for example, by electronic content manager 340.

At block 705, first mobile electronic device 100 establishes a short-range wireless connection 603 with second mobile electronic device 400. For example, short-range wireless connection 603 is a Bluetooth™ connection. Short-range wireless connection 603 is established through pairing of first mobile electronic device 100 and second mobile electronic device Bluetooth™. As an example, a first mobile electronic device 100 initiates Bluetooth™ pairing by searching for one or more devices within range and in a discoverable mode. Upon performing the search, the first mobile electronic device 100 detects any Bluetooth™-enabled devices that are within range and in a discoverable mode. The second mobile electronic device 400 enables Bluetooth™ discovery and is thus discovered by first mobile electronic device 100. As another example, the first mobile electronic device 100 enables discovery and is discovered by the second mobile electronic device 400 when the second mobile electronic device 400 searches for Bluetooth devices that are within range.

For each pairing of devices, the devices attempt to establish a connection, which requires the use of a Personal Identification Number (PIN) to authenticate the endpoints of the connection. For example, if a fixed PIN is associated with the first mobile electronic device 100, a user of the second device enters the PIN code associated with the first mobile electronic device 100 into the second device 400. Upon receiving the correct PIN code, second mobile electronic device 400 is able to successfully authenticate first mobile electronic device and the devices 100, 400 establish a communication link, in order to complete the Bluetooth™ pairing. In another example embodiment, the two devices 100, 400 use Bluetooth™ Simple Secure Pairing (SSP) which requires no user interaction or PIN entry, to complete the Bluetooth™ pairing.

In some example embodiments, once pairing is complete, a further authentication session is carried out between first mobile electronic device 100, and second mobile electronic device 400. In another embodiment, in addition to Bluetooth™ encryption, all communication between first mobile electronic device 100 and second mobile electronic device 400 is encrypted.

In some example embodiments, once first mobile electronic device 100 and second mobile electronic device 400, are paired, first mobile electronic device 100 can send both electronic content and commands to second mobile electronic device 400. Similarly, second mobile electronic device 400 can send both electronic content and commands to first mobile electronic device 100.

At block 710 the first mobile electronic device 100 receives a list of the electronic-content-items stored on the second mobile electronic device 400 through the communication link established at block 705. At block 715, the first mobile electronic device 100 displays, on display 270, the list of electronic-content-items available for viewing from the second mobile electronic device 400. The list is, for example, titles for electronic books stored on device 400, or alternately in electronic content repository 350. The list of electronic-content-items is presented to a user of first mobile electronic device 100 by being displayed on display 270 of output subsystem 235 of first mobile electronic device 100. At block 720 receives a selection for an electronic-content-item from a user of first mobile electronic device 100 who selects an electronic-content-item for viewing using the input subsystem 230 of the first mobile electronic device 100. In one example embodiment, the selection is accomplished by utilizing any one of the navigation keys 105, 107, and 111. At block 725, upon receiving the selection, the first mobile electronic device 100 requests the electronic content corresponding to the selected electronic-content-item from second mobile electronic device 400. At block 730, first mobile electronic device 100 receives the electronic content requested in block 725 from second mobile electronic device 400. The first mobile electronic device 100 may store the received electronic content in electronic content repository 350. A block 735, first mobile electronic device 100 displays the received electronic content on display 270, and plays the audio component, if applicable, through speaker 355.

In some example embodiments, electronic content can be sent in chunks or fragments between first mobile electronic device 100 and second mobile electronic device 400. In other embodiments, electronic content is streamed between first mobile electronic device 100 and second mobile electronic device 400.

Figure 8:
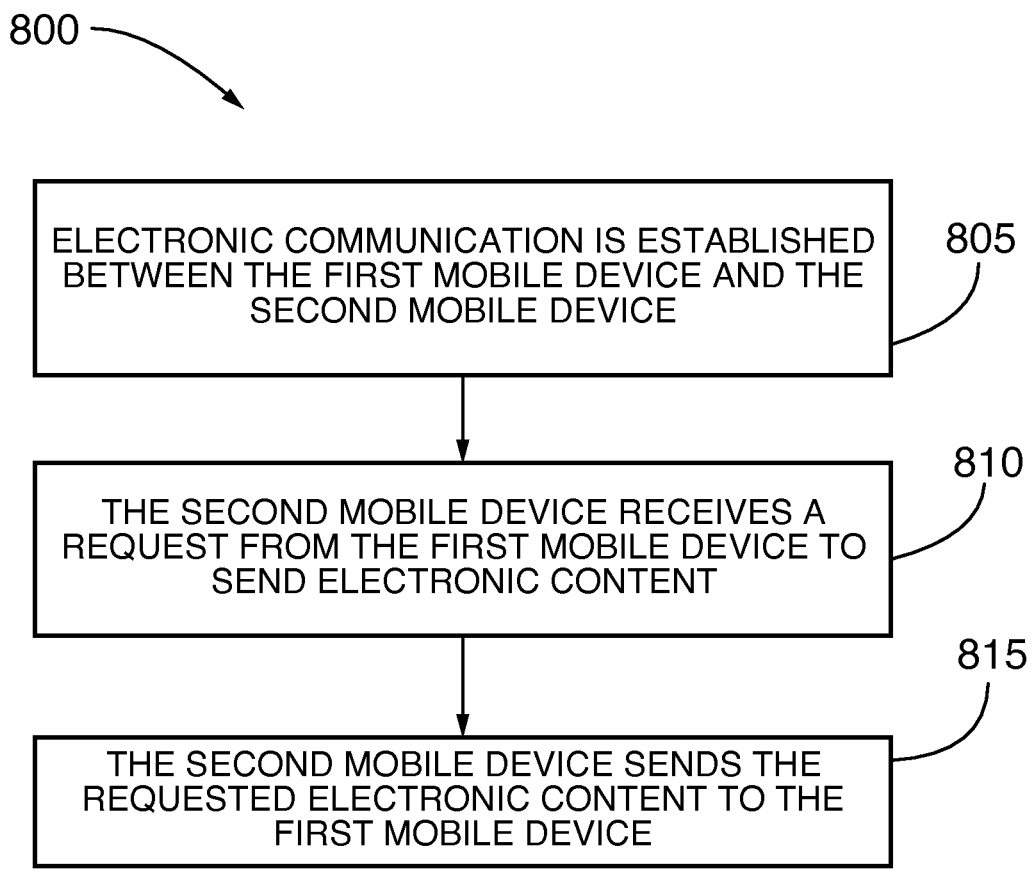
FIG. 8 is a flow chart of a method for execution on the second mobile electronic device of FIG. 4, the method for sending requested electronic content, in accordance with the example embodiment of FIG. 7 of the present disclosure.

FIG. 8 is a flow chart of an example method 800 for execution on second mobile electronic device 400, the method for enabling selection and for sending electronic content, in accordance with the example embodiment of FIG. 7 of the present disclosure. Method 800 is carried out, for example, by electronic content manager 580.

At block 805, the second mobile electronic device 400 establishes a short-range wireless connection with first mobile electronic device 100. At block 810, the second mobile electronic device 400 receives a request from first mobile electronic device 100 to send electronic content to first mobile electronic device 100. At block 815, the second mobile electronic device 400 sends the requested electronic content to the first mobile electronic device 100, over the short-range wireless connection 603 established between the two devices 400, 100.

In some example embodiments, electronic content sent by second mobile electronic device 400 to first mobile electronic device comprises e-mail attachments containing electronic content.

In some example embodiments, first mobile electronic device 100 and second mobile electronic device 400 share electronic content lists on a regular basis. For example, when new electronic content is added to or removed from second mobile electronic device 400, second mobile electronic device 400 sends an updated list of the electronic content stored thereon, to first mobile electronic device 100. Similarly, when new electronic content is added to or removed from first mobile electronic device 100, first mobile electronic device 100 sends an updated list of the electronic content stored thereon, to second mobile electronic device 400.

Figure 9:
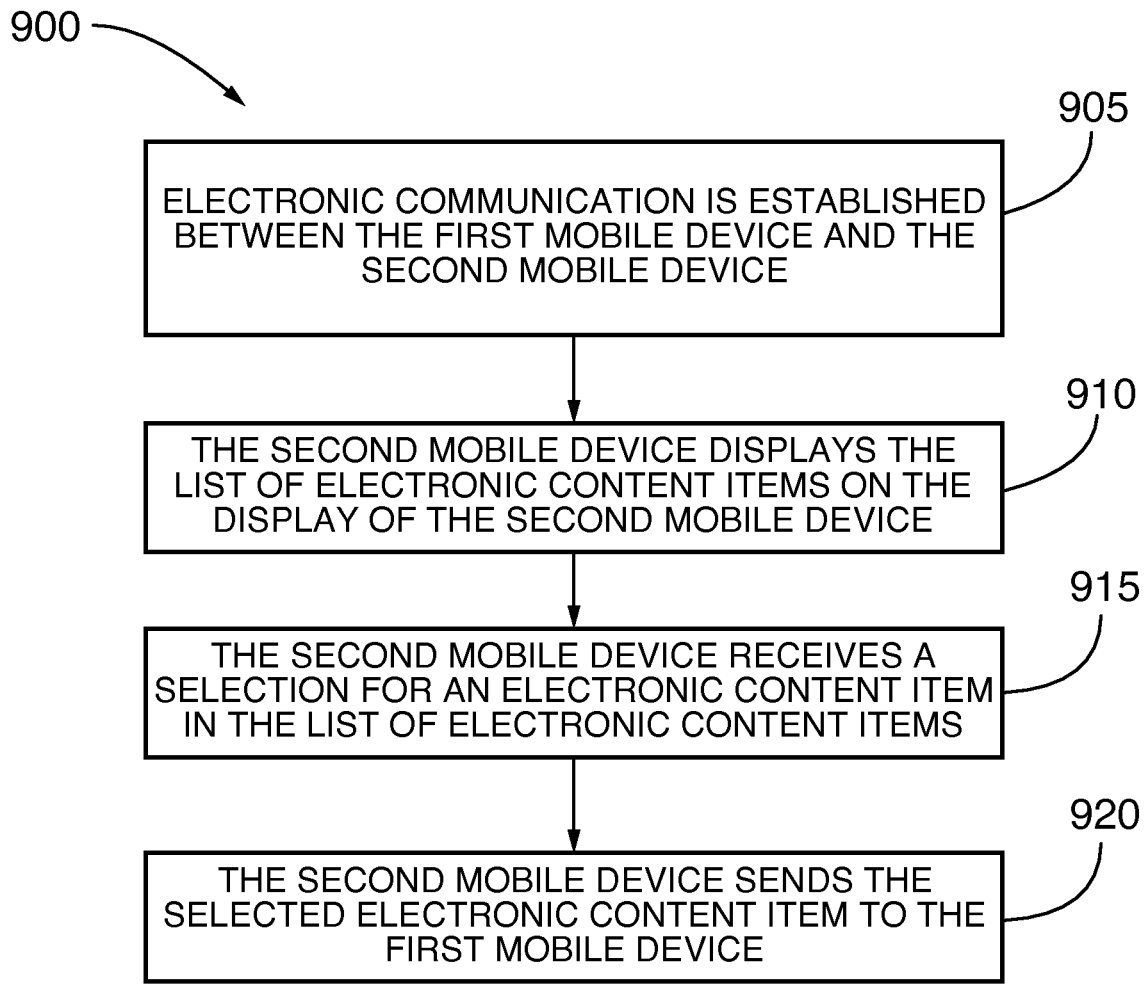
FIG. 9 is a flow chart of a method for execution on the second mobile electronic device of FIG. 4, the method for enabling selection of electronic content and for sending selected electronic content to the first mobile electronic device of FIG. 1 in accordance with another example embodiment of the present disclosure.

Turning now to FIG. 9, there is shown a flow chart of an example method 900 for execution on the second mobile electronic device 400, the method for enabling selection and for sending electronic content to the first mobile electronic device 100 in accordance with another example embodiment of the present disclosure. Method 900 is carried out, for example, by electronic content manager 580.

At block 905, the second mobile electronic device 400 establishes a short-range wireless connection device with the first mobile electronic device 100, such as by way of Bluetooth™ pairing, in the manner described earlier. At block 910, a list of electronic-content-items available for viewing is displayed on display 410 of the second mobile electronic device 400. At block 915, second mobile electronic device 400 receives a selection to send an electronic-content-item to first mobile electronic device 100. At block 920, second mobile electronic device 920 sends the selected electronic-content-item to first mobile electronic device 100 over short-range wireless connection 603.

Figure 10:
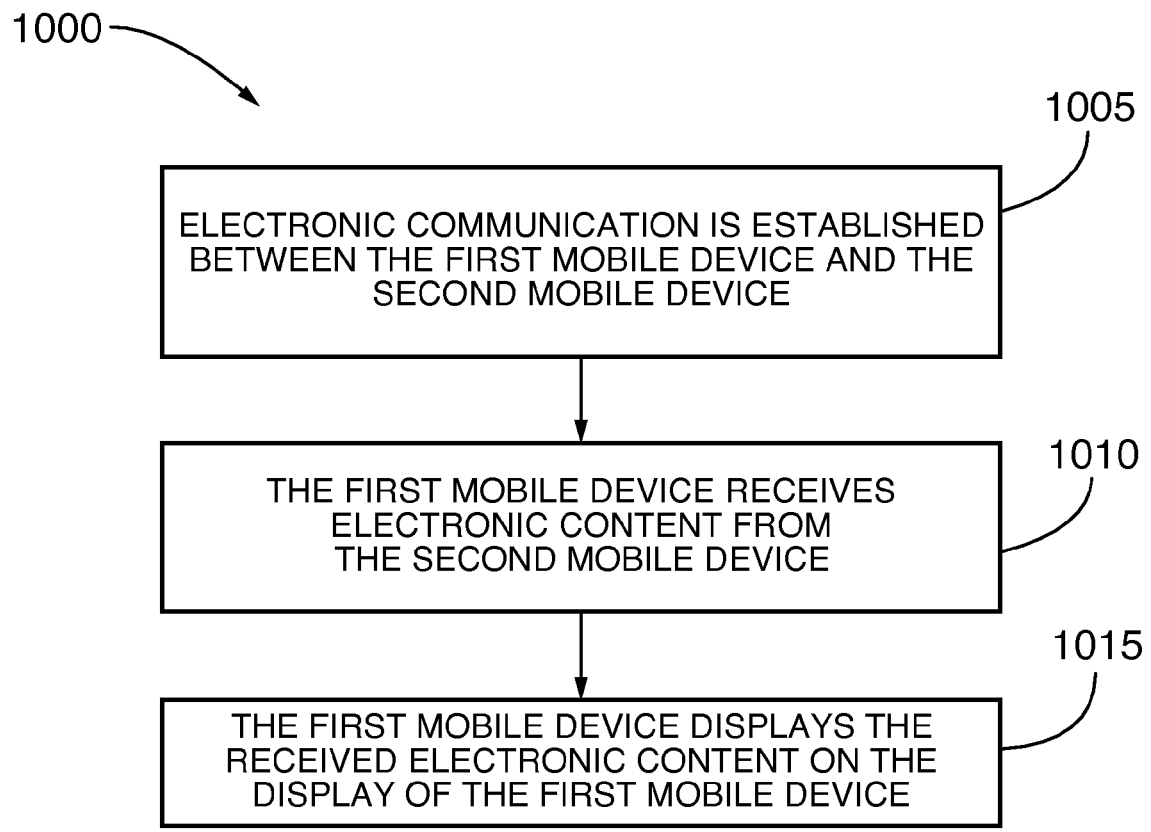
FIG. 10 is a flow chart of a method for execution on the first mobile electronic device of FIG. 1, the method for receiving and displaying electronic content in accordance with the example embodiment of FIG. 9 of the present disclosure.

FIG. 10 is a flow chart of an example method 1000 for execution on first mobile electronic device 100, the method for receiving and displaying electronic content in accordance with the example embodiment of FIG. 9 of the present disclosure. Method 1000 is executed by electronic content manager 340. At block 1005, first mobile electronic device 100 establishes a short-range wireless connection with second mobile electronic device 400 as described earlier. At block 1010, first mobile electronic device 100 receives electronic content sent from second mobile electronic device 400. First mobile electronic device 100 stores the received electronic content in electronic content repository 350. At block 1015, first mobile electronic device 100 displays the received electronic content on display 270, and plays the audio component, if applicable, through speaker 355.

Figure 11:
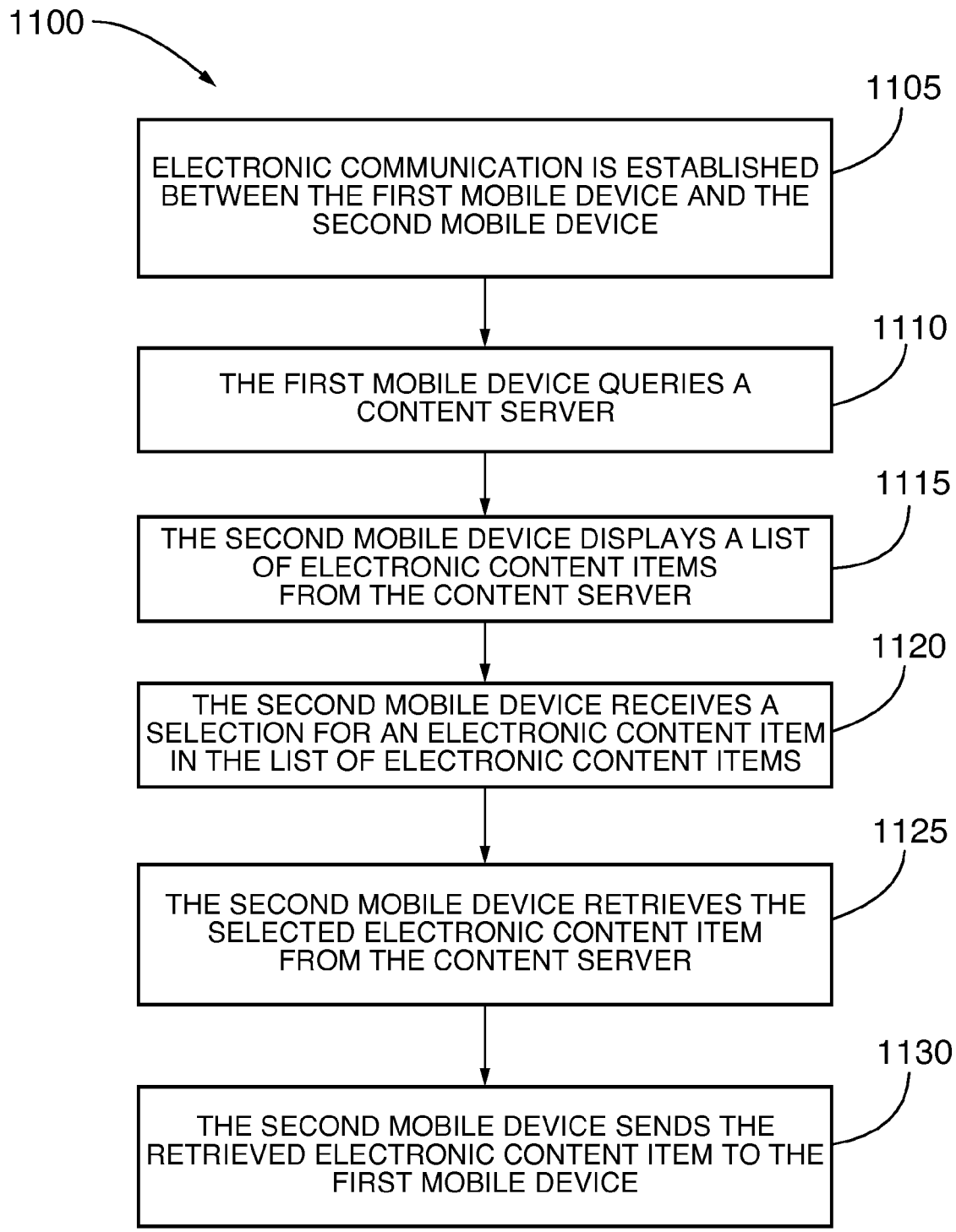
FIG. 11 is a flow chart of a method for execution on the second mobile electronic device of FIG. 4, the method for downloading electronic content and for sending the downloaded electronic content to the first mobile electronic device of FIG. 1 in accordance with yet another example embodiment of the present disclosure.

FIG. 11 is a flow chart of an example method 1100, for execution on the second mobile electronic device 400, the method for retrieving electronic content and for sending the retrieved electronic content to first mobile electronic device 100 in accordance with yet another example embodiment of the present disclosure. Method 1100 is carried out by electronic content manager 580. At block 1105, second mobile electronic device 400 establishes a short-range wireless connection device with first mobile electronic device 100, in the manner described earlier. At block 1110, second mobile electronic device 400 queries content server 680 via communication subsystem 504 and wide area network 650. Content server 680 provides a list of electronic-content-items stored on repository 685 and available for download. At block 1115 the list of available electronic content is displayed on display 410 on second mobile electronic device 400. At block 1120, second mobile electronic device 400 receives a selection, for example by the user, to download certain content from content repository 685 via content server 680, to second mobile electronic device 400, for viewing on first mobile electronic device 100. The selection is communicated to content server 680 via communication subsystem 504 and wide area network 650. At block 1125, second mobile electronic device 400 receives the selected content from the content repository 685 via content server 680. Second mobile electronic device 400 stores the received content in electronic content repository 590. At block 1130, second mobile electronic device 400 sends the downloaded content to first mobile electronic device 100 for viewing, and plays the audio component, if applicable, through speaker 355.

Figure 12:
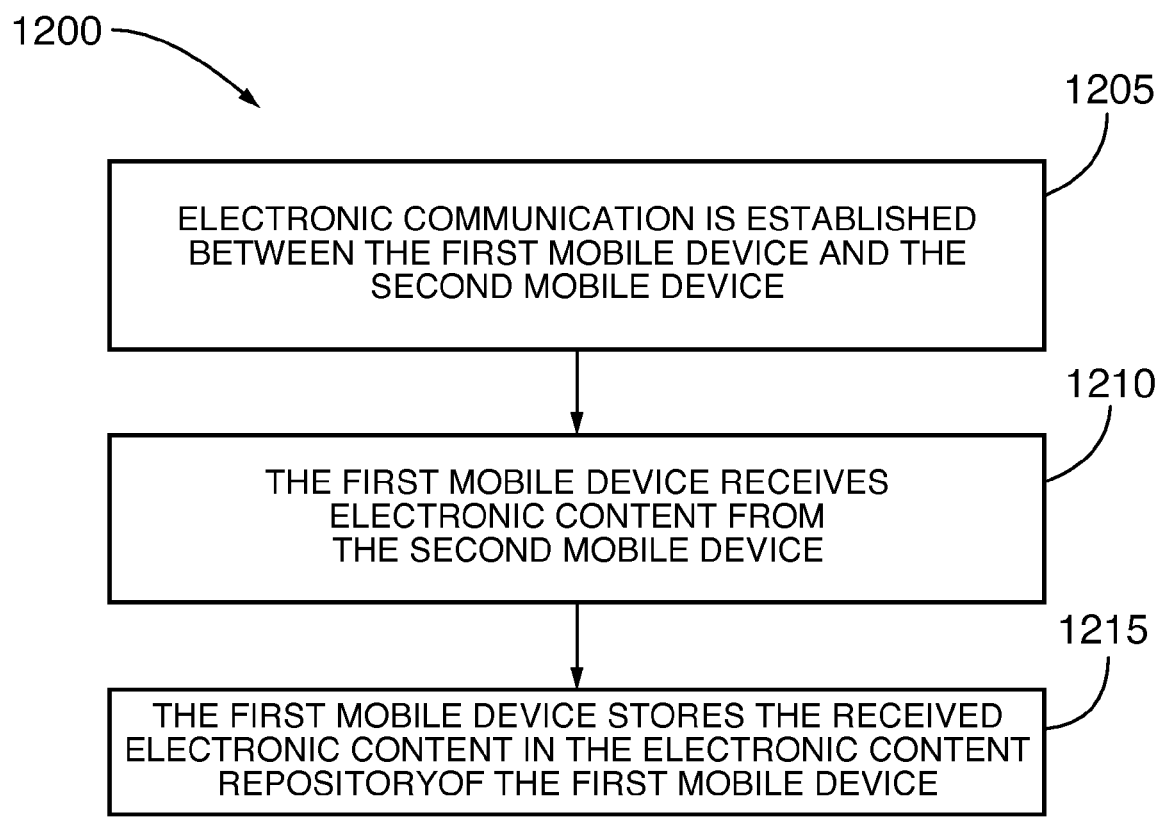
FIG. 12 is a flow chart of a method for execution on the first mobile electronic device of FIG. 1, the method for receiving and storing electronic content, in accordance with the example embodiment of FIG. 11 of the present disclosure.

FIG. 12 is a flow chart of an example method 1200 for execution on the first mobile electronic device 100, the method for receiving and storing electronic content, in accordance with the example embodiment of FIG. 11 of the present disclosure. Method 1200 is executed by content manager 340. At block 1205 first mobile electronic device 100 establishes a short-range wireless connection with second mobile electronic device 400 as described earlier. At block 1210, first mobile electronic device 100 receives electronic content from second mobile electronic device 400. In one example embodiment, the received electronic content is electronic content retrieved by second mobile electronic device 400 from content repository 685 via content server 680. At block 1215, first mobile electronic device 100 stores the received electronic content in electronic content repository 350. First mobile electronic device 100 also displays the received electronic content on display 270 as described in block 1015 of FIG. 10, for example.

In an example embodiment, second mobile electronic device 400 downloads electronic content from content repository 685 via content server 680, in chunks. In another embodiment content server 680 streams electronic content from content repository 685 to mobile electronic device 400.

While the blocks comprising the methods are shown as occurring in a particular order, it will be appreciated by those skilled in the art that many of the blocks are interchangeable and can occur in different orders than that shown without materially affecting the end results of the methods.

The implementations of the present disclosure described above are intended to be examples only. Those of skill in the art can effect alterations, modifications and variations to the particular example embodiments herein without departing from the intended scope of the present disclosure. Moreover, selected features from one or more of the above-described example embodiments can be combined to create alternative example embodiments not explicitly described herein.

What is claimed is:

1. A mobile electronic device, comprising:
a short-range communications subsystem;
a long-range communications subsystem;
a processor coupled to and in cooperative arrangement with the short range communications subsystem and the long-range communications subsystem, the processor configured to:
retrieve, based on establishing a short-range wireless connection via the short-range communications subsystem, a list of a plurality of selectable electronic-content-items from a server;
present, based on retrieving the list, the list of the plurality of selectable electronic-content-items available to a remote electronic device, the plurality of selectable electronic-content-items comprising selectable electronic-content-items that are not stored on the mobile electronic device and are stored on a server;
receive, based on presenting the list of the plurality of selectable electronic-content-items, a selection identifying one or more selected electronic-content-items of the plurality of selectable electronic-content-items;
retrieve, based on receipt of the selection, the one or more selected electronic-content-items from the server via the long-range communications subsystem and a communications network;
transmit, based on receipt of the selection identifying one or more selected electronic-content-items and based on retrieval of the one or more selected electronic-content-items from the server, the one or more selected electronic-content-items via a short-range wireless connection to the remote electronic device, and
wherein the short-range communications subsystem of the mobile electronic device transmits an electronic contact list, wherein the electronic contact list comprises an updated list of electronic content stored on the mobile electronic device.

2. The device of claim 1, wherein the short-range communications subsystem of the mobile electronic device transmits the list of the plurality of selectable electronic-content-items via the short-range wireless connection in response to a query received.

3. The device of claim 2, wherein the mobile electronic device further comprises an input/output subsystem having a user interface at which the query is received by the mobile electronic device.

4. The device of claim 2, wherein the mobile electronic device receives the query originating from the remote electronic device at the short-range communications subsystem.

5. The device of claim 1, wherein the selection identifying one or more selected electronic-content-items is received at an input/output subsystem of the mobile electronic device.

6. The device of claim 5, wherein the input/output subsystem of the mobile electronic device comprises a user interface of the mobile electronic device.

7. The device of claim 1, wherein the long-range communications subsystem establishes a long-range wireless connection to the server after receiving the selection.

8. The device of claim 1, wherein the plurality of selectable electronic-content-items are stored in an electronic content manager of the mobile electronic device.

9. The device of claim 1, further comprising:
an electronic content manager; and an electronic content repository controlled by the electronic content manager.

10. The device of claim 9, wherein the mobile electronic device retrieves the plurality of selectable electronic-content-items from a content server external the mobile electronic device and stores the retrieved plurality of selectable electronic-content-items in the electronic content repository of the mobile electronic device.

11. The device of claim 1, wherein the mobile electronic device further comprises an electronic content repository in which the plurality of selectable electronic-content-items are stored.

12. The device of claim 1, further comprising:
a display subsystem having a display and a controller for controlling the display.

13. The device of claim 1, wherein the short-range communications subsystem enables external communication of the mobile electronic device within a short-range; and
wherein the long-range communications subsystem enables external communication of the mobile electronic device within a long-range that is substantially greater than the short-range.

14. The device of claim 1, wherein the short-range communications subsystem establishes a short-range wireless connection between the mobile electronic device and another mobile electronic device.

15. The device of claim 1, wherein the plurality of selectable electronic-content-items comprise one or more of an electronic book, video, music, multimedia, and an e-mail attachment.

* * * * *